March 3, 1964 — H. W. ROCKWELL — 3,122,850
FOUR WHEEL VEHICLE
Filed March 26, 1962 — 2 Sheets-Sheet 1
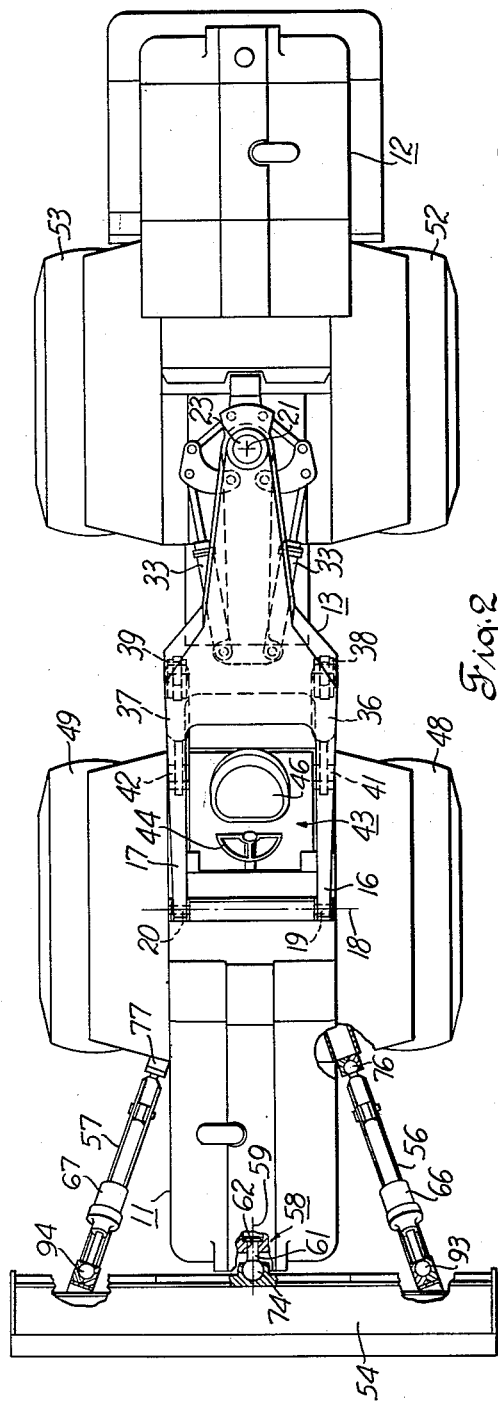
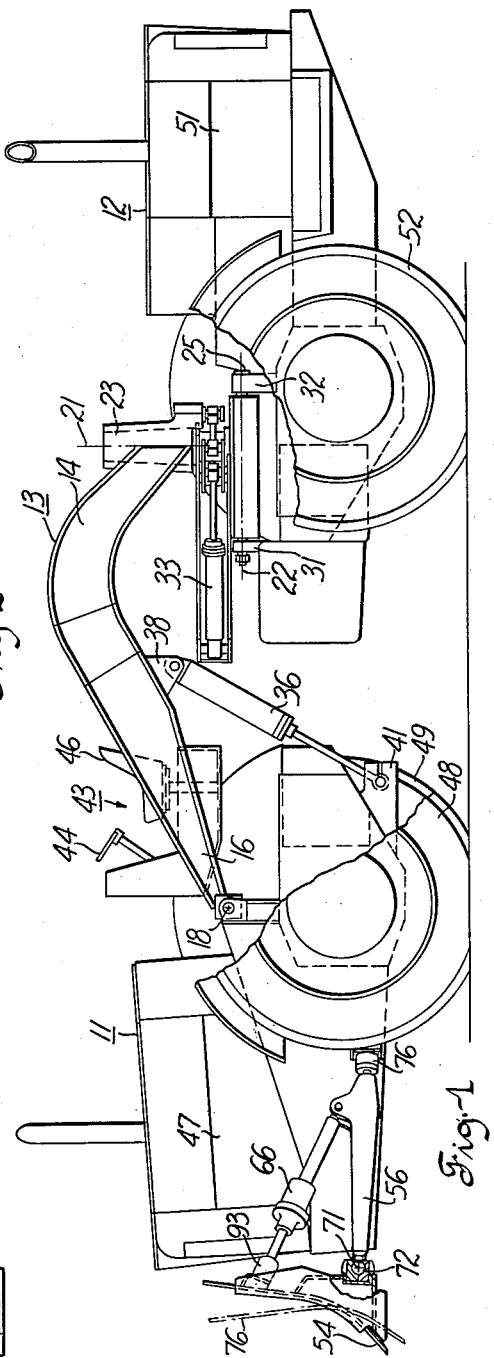
Inventor
Harvey W. Rockwell
by Charles L. Schmal
Attorney March 3, 1964  H. W. ROCKWELL  3,122,850
FOUR WHEEL VEHICLE
Filed March 26, 1962  2 Sheets-Sheet 2
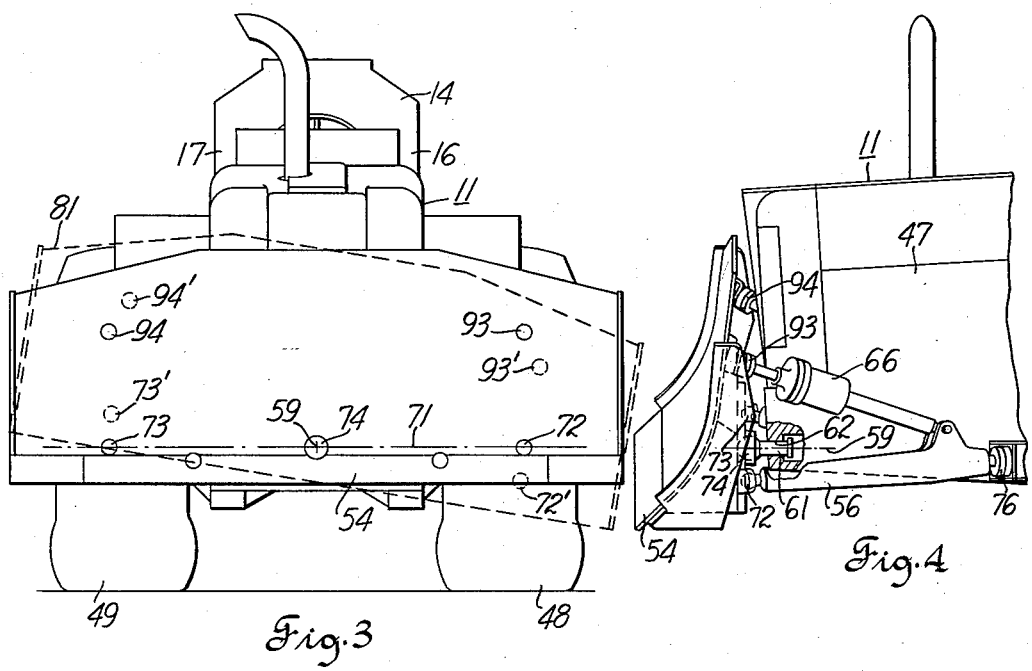
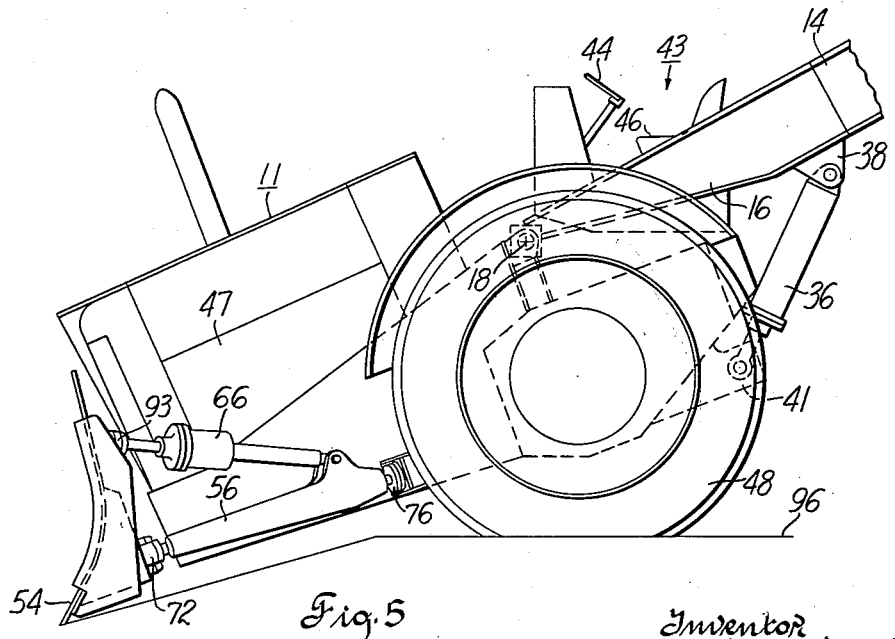
Inventor
Harvey W. Rockwell
By Charles L. Schnurr
Attorney United States Patent Office 3,122,850
Patented Mar. 3, 1964

3,122,850
FOUR WHEEL VEHICLE
Harvey W. Rockwell, Cedar Rapids, Iowa, assignor to Allis-Chalmers Manufacturing Company, Milwaukee, Wis.
Filed Mar. 26, 1962, Ser. No. 182,593
8 Claims. (Cl. 37—144)

This invention relates to a four wheel vehicle wherein a pair of two wheeled units are interconnected by draft means on vertical and transverse axes, respectively.

It is an object of this invention to provide an improved traction vehicle wherein a pair of engine driven tractors are interconnected by a draft means for steering movement and vertical swinging movement, respectively.

It is a further object of this invention to provide an improved traction vehicle suitable for pusher and dozing operations which utilizes the same basic engine driven tractor units which are employed in dual engine scraper units.

It is a further object of this invention to provide an improved traction vehicle with a pushing attachment which is movable in unison with a vertical swingable two wheel tractor portion of the vehicle.

It is a further object of this invention to provide a traction vehicle including a draft frame interconnecting a pair of two wheeled support units on transverse and vertical axes, respectively, an operator's station on the draft frame and power means for vertically swinging one of the two wheel units about the transverse axis.

It is a further object of this invention to provide an improved mounting arrangement for a dozer which is mounted on a tractor for vertical swinging movement therewith.

These and other objects of this invention will be apparent when the following description is read in conjunction with the drawings in which:

FIG. 1 is a side view of a vehicle incorporating the present invention;

FIG. 2 is a top view of the vehicle shown in FIG. 1;

FIG. 3 is a front view of the vehicle shown in FIG. 1;

FIG. 4 is a side view of the front tractor of the vehicle showing the dozer mounted thereon adjusted to a tilted position; and FIG. 5 is a side view of the vehicle showing the front tractor adjusted to a dozer digging position.

Referring to FIGS. 1 and 2, the illustrated traction vehicle, in which the present invention is incorporated, includes a front two wheel tractor 11 and a rear two wheel tractor 12 interconnected by draft means 13. The draft means 13 includes a draft frame 14 and a king pin member 23. The forward end of the draft frame 14 is bifurcated presenting a pair of transversely spaced legs 16, 17 the forward ends of which are pivotally connected on a transverse pivot axis 18 to the front tractor 11 by pins 19, 20. The opposite end of the draft frame 14 is pivotally connected on a vertical steering axis 21 to king pin member 23. The king pin member 23 is in turn pivotally connected to the rear tractor 12 by a pin 25 secured to brackets 31, 32, the pin 25 having a longitudinal axis 22. The rear tractor 12 and steering means 33 are similar to structure shown in my Patent Number U.S. 2,885,022, Steering Mechanism, issued May 5, 1959. Steering means 33 effect 90° steering in either direction from the straight ahead position.

A pair of hydraulic rams 36, 37 are interposed between the draft frame 14 and the front two wheel unit 11. The upper ends of rams 36, 37 are pivotally connected to transversely spaced brackets 38, 39 spaced rearwardly from transverse axis 18. The lower or rod ends of the rams 36, 37 are pivotally connected to mounting brackets 41, 42 in rearwardly and downwardly spaced relation to transverse axis 18.

The operator's station 43 is conveniently and safely mounted on and intermediate the legs 16, 17. The operator's station 43 provides a steering wheel 44, operator's seat 46, and other manual controls required to operate both of the tractors 11, 12 and any tool or attachment connected to the vehicle.

The front unit 11 includes an engine 47 for driving the wheels 48, 49 thereof and the rear tractor 12 includes an engine 51 for driving the wheels 52, 53 thereof. Suitable controls, not shown, are provided at the operator's station 43 to expand and contract the hydraulic rams 36, 37 at the will of the operator. This permits the front end of the front tractor 11 and any attachment thereon, such as a dozer 54, to be raised and lowered out of and into an earth working position. In other words an earthworking implement such as a dozer 54, which includes a soil engaging portion in the form of a blade, may be raised and lowered in unison with the front unit 11 by the power means 36, 37 attaining a raised position such as illustrated in FIG. 1, wherein the dozer 54 does not contact the earth, and a lowered position such as is illustrated in FIG. 5, wherein the earth engaging portion of the dozer 54 does contact the earth.

When the rams 36, 37 are contracted or expanded the front tractor will swing vertically about axis 18 to the desired position. As shown in FIG. 5, the rams 36, 37 are completely contracted and the dozer 54 is in its deepest digging position. The dozer 54 is secured to the front tractor by attaching means which permit the dozer to be raised and lowered in unison with the front tractor, as the latter is pivoted about its transverse axis 18, and also to be tilted and pitched. The attaching means for the dozer 54 includes a pair of struts 56, 57 having front ends pivotally connected to the dozer by ball joints 72, 73 and rear ends pivotally connected to the tractor by ball joints 76, 77. The attachment means includes a universal connection between the front of the tractor 11 and the dozer 54 including an intermediate pivot member 58. The pivot member forms a ball and socket joint 74 with the dozer and has a cylindrical pin portion 61 which has a sliding and rotatable fit with a bore 62 in the front end of the tractor 11. The attaching means also includes adjusting means for varying the tilt and pitch of the dozer 54, such means including a pair of hydraulic rams 66, 67 having their rear ends pivotally connected to the struts or braces 56, 57 and having their front ends pivotally connected by ball and socket joints 93, 94 to the upper rear of the dozer 54.

When the rams 66, 67 are both expanded, the dozer will be tipped about a transverse axis 71 passing through the centers of the ball and socket joints 72, 73, 74 to the position shown in dot-dash lines 76. Thus the pitch of the dozer is adjusted at the will of the operator through hydraulic controls, not shown, for the rams 66, 67.

When ram 67 is expanded and ram 66 is contracted the dozer attachment will be tilted about axis 59 of pin portion 61 to the position shown in FIG. 4, such position being shown in dash-dot lines 81 in FIG. 3. As shown in FIG. 3, the ball and socket joints 72, 73 will move to positions 72', 73', respectively, and the ball and socket joints 93, 94 will move to positions 93', 94', respectively. During tilting of the dozer, the axis 71 will move slightly toward the tractor 11 and such dozer movement is permitted by the sliding fit between pin portion 61 and bore 62. If ram 67 is contracted and ram 66 is expanded, the dozer attachment will be tilted about axis 59 in the opposite direction.

FIG. 5 shows the front tractor unit 11 pivoted about axis 18 to the extent permitted by contraction of rams 36, 37. In such position the dozer 54 penetrates the ground to an appreciable depth below ground level 96. The operator's station is not tilted since it is mounted on the draft frame 14.

From the foregoing description it is readily apparent that an extremely novel vehicle has been provided which includes front and rear tractor units each with two wheels driven by its own propelling engine. The tractor units 11, 12 are interconnected in a novel manner by a draft frame 14 permitting 90° steering of one of the tractors and pivoting of the other tractor about a transverse pivot axis to raise and lower an implement such as a pushing attachment connected thereto. The dozer attachment or other suitable pushing attachment may be used for pushing tractor scraper units during their loading operation and the present invention permits the operator to adjust the elevation of the pushing attachment to match the height of the push block on the scraper unit being pushed. Locating the operator station between a pair of transversely spaced legs 16, 17 of the draft frame 14 locates the operator at an appropriate central position for efficient operation of the vehicle and its attachments. The operator's station is not subject to the pivotal movement of the front tractor 11 since it is not mounted thereon and the operator in such position has good visual observance of the operation of the tractor and its attachments.

The illustrated embodiment of this invention is economical to manufacture inasmuch as tractor units 11 and 12 are basically the rear and front tractor units of a dual engine motor scraper. The rear engine unit which is illustrated in Harvey W. Rockwell and Dale W. Hawk application, Serial No. 161,481, filed December 22, 1961, on an Earth Mover, can be modified at little expense to provide the front tractor 11 of the present invention.

It is not intended to limit this invention to the illustrated embodiment, but rather it is intended that this invention shall include such other embodiments as are within the scope of the appended claims.

What is claimed is:

1. A traction vehicle comprising: a front two wheel tractor including an engine extending forwardly from the wheels driven thereby; a rear two wheel tractor including an engine extending rearwardly from the wheels driven thereby; draft means for interconnecting said tractors including a draft frame, a pivot structure pivoted to said rear tractor on a longitudinal axis and to said draft frame on a vertical axis and means pivotally connecting the front end of said frame to said front tractor on a transverse axis spaced rearwardly from the front end of said front tractor; an implement; attachment means connecting said implement to the front end of said front tractor for vertical swinging movement therewith; and power means interposed between said frame and said front tractor for pivoting the latter about said transverse axis thereby adjusting the elevation of the front end of said front tractor.

2. The structure set forth in claim 1 wherein the forward end of said draft frame is divided into a pair of transversely spaced legs pivotally connected at their forward ends to said front tractor on said transverse axis and further comprising an operator's station on said vehicle between said legs.

3. The structure set forth in claim 2 wherein said operator's station is supported on the legs of said frame.

4. The structure set forth in claim 1 wherein said power means includes a hydraulic ram pivotally connected at one end to an intermediate part of said draft frame and pivotally connected at its other end to the rear of said front tractor.

5. The structure set forth in claim 1 wherein said implement is a dozer and said attachment means includes adjusting means for varying the tilt and pitch of said dozer.

6. The structure set forth in claim 5 wherein said attachment means includes a universal joint between the front of said front tractor and said dozer including an intermediate pivot member pivotally secured to said front tractor on a longitudinal axis in longitudinal shiftable relation thereto and a pair of struts pivotally connected at their rear ends to said front tractor at transversely spaced points, respectively, and pivotally connected at their front ends to said dozer on opposite lateral sides, respectively, of said universal joint, and wherein said adjusting means includes a pair of hydraulic rams between said struts, respectively, and said dozer.

7. The structure set forth in claim 1 wherein said implement is a dozer.

8. A vehicle comprising: a first two wheel unit, a second two wheeled unit, one of said units including a propelling engine, a draft frame having one end connected to said second unit for pivotal movement about a vertical axis, means pivoting said second unit relative to said frame about said vertical axis thereby effecting steering of said vehicle, means pivotally connecting the other end of said frame to said first unit for vertical swinging of the latter about a transverse pivot axis, an earthworking implement secured to said first unit on the end thereof remote from said second unit for vertical swinging movement with said first unit including an earth engaging portion brought into contact with the earth upon vertical swinging movement of said first unit, and power means interposed between said frame and first unit for effecting vertical swinging movement of said first unit about said transverse axis between a raised position wherein said earth engaging portion does not contact the earth and a lowered position wherein said earth engaging portion does contact the earth.

References Cited in the file of this patent

UNITED STATES PATENTS

| | | |
|---|---|---|
| 2,311,553 | LeTourneau | Feb. 16, 1943 |
| 2,347,882 | Choate et al. | May 2, 1944 |
| 2,687,586 | Dickinson | Aug. 31, 1954 |
| 2,883,774 | Clifford | Apr. 28, 1959 |
| 2,901,844 | Rockwell | Sept. 1, 1959 |

FOREIGN PATENTS

| | | |
|---|---|---|
| 584,697 | Great Britain | Jan. 21, 1947 |